United States Patent [19]

Dane

[11] Patent Number: 4,540,194
[45] Date of Patent: Sep. 10, 1985

[54] TRAILER HITCH

[76] Inventor: Roy Dane, P.O. Box 42, Harrah, Wash. 98933

[21] Appl. No.: 535,113

[22] Filed: Sep. 23, 1983

[51] Int. Cl.³ .............................................. B60D 1/06
[52] U.S. Cl. .............................. 280/491 B; 280/423 R
[58] Field of Search ........... 280/491 R, 491 B, 491 F, 280/511, 423 R, 433

[56] References Cited

U.S. PATENT DOCUMENTS

| | | | |
|---|---|---|---|
| 2,494,799 | 1/1950 | Duvall et al. | 280/491 B X |
| 3,791,674 | 2/1974 | Berends | 280/491 B X |
| 4,256,324 | 3/1981 | Hamilton | 280/491 B X |

Primary Examiner—Joseph F. Peters, Jr.
Assistant Examiner—Charles R. Watts
Attorney, Agent, or Firm—Robert Keith Sharp

[57] ABSTRACT

A trailer hitch for use in pickups or similar vehicles includes a plate which is adapted to lie flush with the bed. The plate has a large aperture. A hitch block, which has a connecting ball at one end, is journaled on an axis below the plate in such a manner that, in the towing position, the ball is above the plate and, when the vehicle is used for hauling, the entire block can be folded down beneath the bed. The other end of the block is provided with a spring-urged retractable pin. An arcuate member beneath the plate has holes which receive the pin to hold the block in a selected position.

5 Claims, 7 Drawing Figures

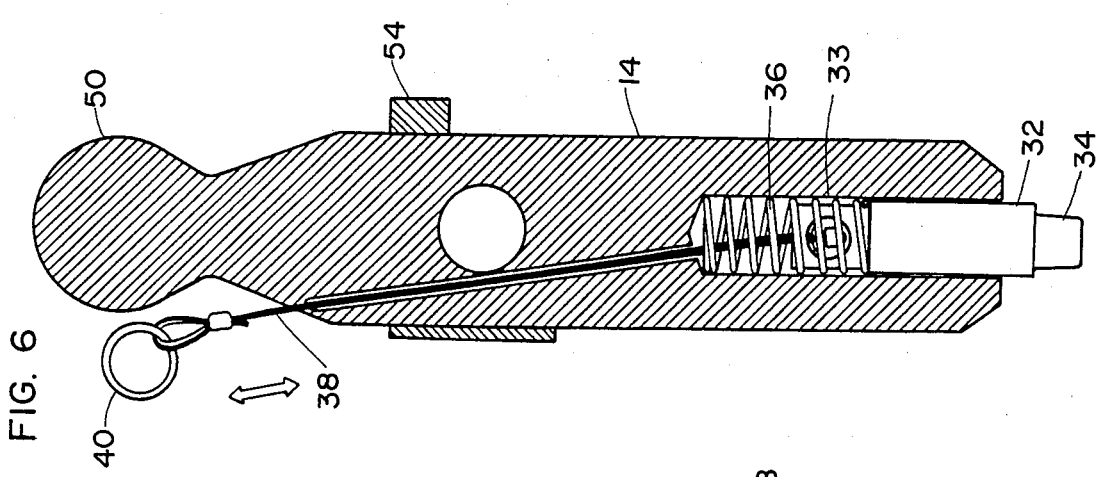
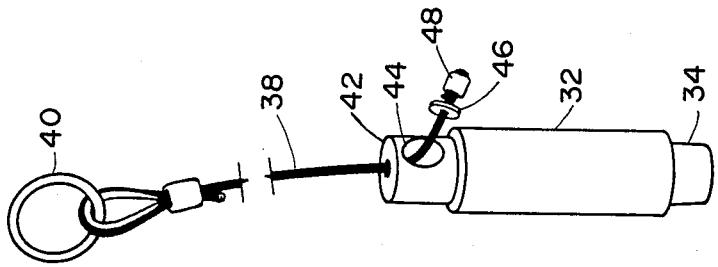
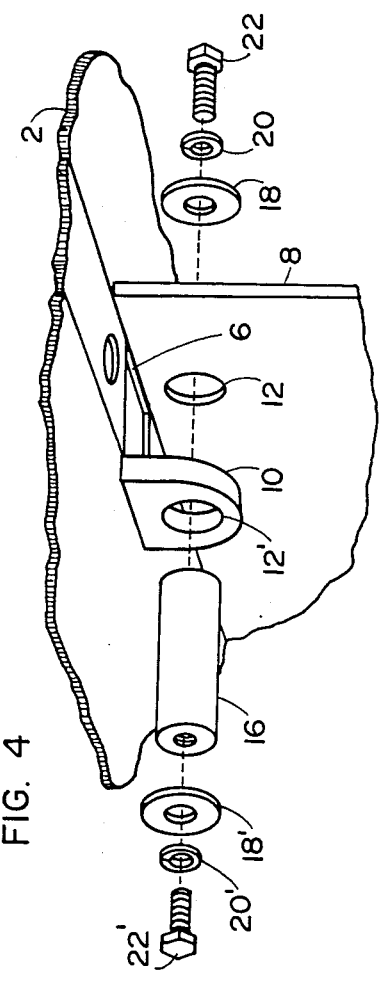
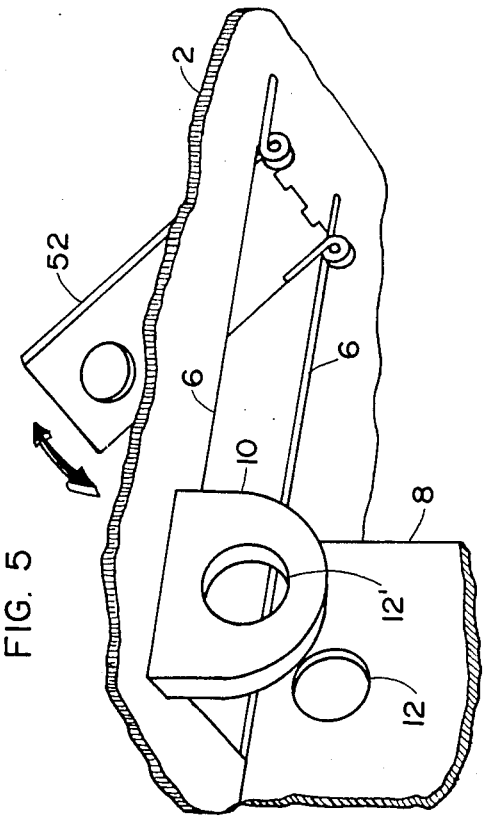

TRAILER HITCH

INTRODUCTION

This invention relates to a trailer hitch for use in pickup trucks or other vehicles which alternately serve the purposes of drawing a trailer and hauling material. In such cases it is desirable that the hitch be foldable so that when not in use it will not interfere with the mateial being hauled and, furthermore, that the structure be such that the surface of the vehicle be essentially closed so that material will not escape. I have devised a hitch fitting those characteristics which is particularly simple and sturdy.

SUMMARY OF THE INVENTION

My hitch includes a top plate which lies flush with the bottom of the bed of the pickup or similar vehicle. An aperture is provided in this plate. The coupling block is mounted in the aperture and journaled on an axis located below the plate a sufficient distance to allow the block to fold down so that it will lie below the plate. One end of the axis is mounted in a vertically extending plate which is integral with or welded to the top plate and an arcuate member is integral with or welded to the vertical plate. Two holes are provided in this arcuate member, one vertically below the axis and the other positioned horizontally from the axis. The coupling block is provided with an axial bore in which a latching pin is mounted. A spring urges the pin outwardly, and a cable passing through the block is provided for manual retraction of the pin. When a trailer is to be connected, the coupling block is positioned vertically with the latch pin in the hole beneath the axis. The coupling block carries a hitch ball which in this position extends above the floor of the bed. When the vehicle is to be used for hauling, the latch pin is manually retracted by use of the cable and the block is swung into a horizontal position. The latch pin is released and passes through the other hole. The entire block is now positioned below the top plate. A hinged cover partially closes the aperture in this position. When the vehicle is to be used for pulling a trailer this hinged cover is raised, the block is swung into its vertical position and the cover is again lowered. In this position it rests against the block and serves to strengthen the assembly.

BRIEF DESCRIPTION OF THE DRAWINGS

In the drawings:

FIG. 4 is an exploded partial view showing the manner in which the coupling block is journaled.

FIG. 5 is a partial perspective view taken from below showing the top plate and the cover.

FIG. 6 is a vertical section through the coupling block.

FIG. 7 is a perspective view of the latch pin separately from the coupling block.

DETAILED DESCRIPTION

Figure 1:
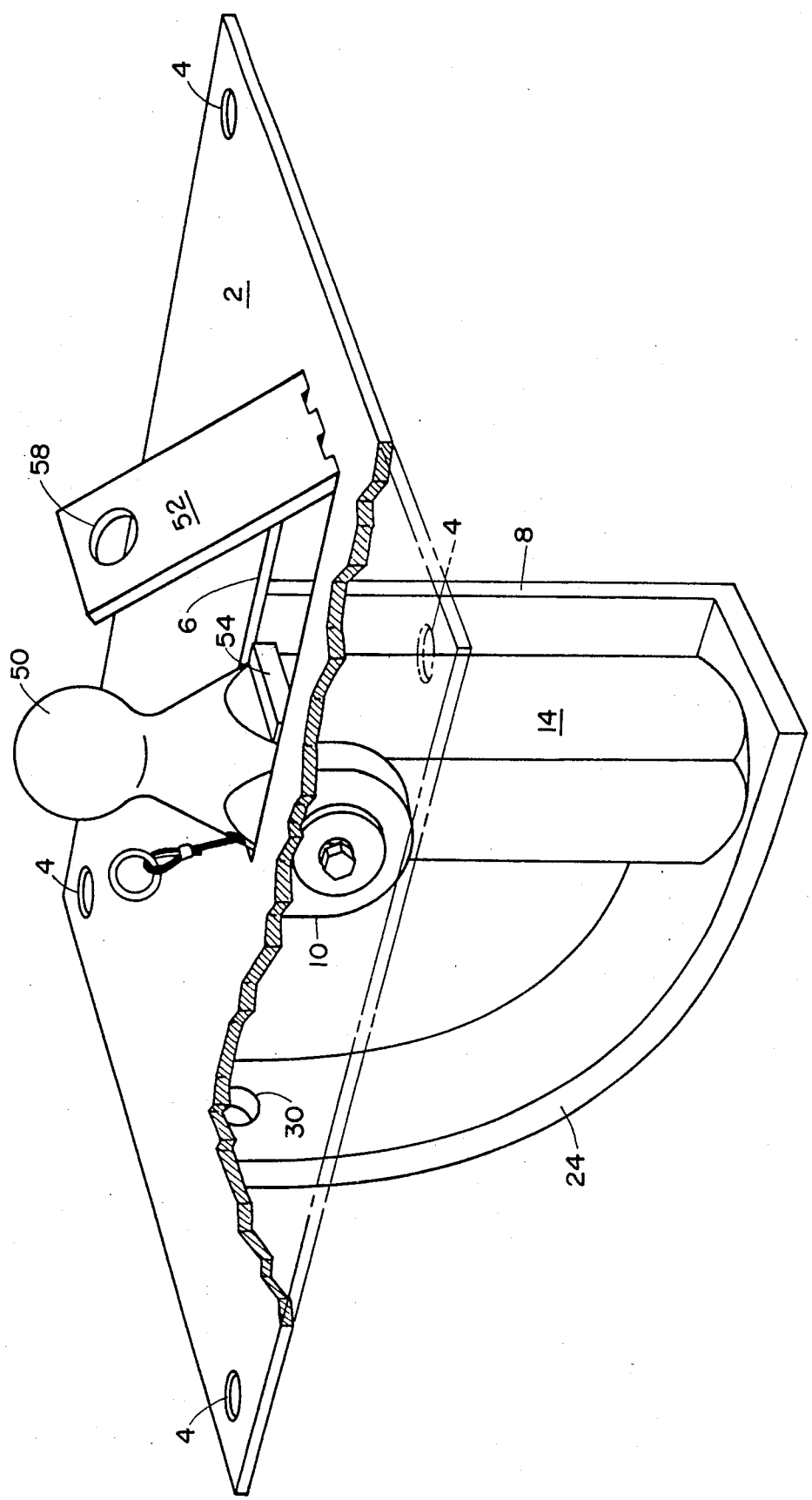
FIG. 1 is a perspective view of my hitch with parts of the top plate broken away and shown in phantom lines in order to better show the structure.

Referring to the drawings, the device includes a top plate 2 which is provided wih holes 4 for securing the plate 2 to the bed of the pickup or to frame members beneath the bed. The plate 2 is provided with a relatively large aperture 6. A vertical plate 8 formed integral with plate 2 or, more commonly, welded to it, extends vertically downwardly beside aperture 6. Bracket 10 extends downwardly from plate 2 beside aperture 6 opposite to plate 8. Plate 8 and bracket 10 are provided with holes 12, 12', respectively, which are aligned axially with each other. The conductor block 14 is journaled on pin 16 passing through holes 12, 12'. The pin 16 is held in place by washers 18, 18', lock washers 20, 20' and screws 22, 22'. The latter are, of course, screwed into the ends of pin 16. An arcuate restraining member 24 is integral with or, more commonly, welded to vertical plate 8. Member 24 spans an arc of approximately 90 degrees and preferably terminates in two short tangential portions 26, 26'. This is not essential, however, and the entire member may be arcuate.

As best shown in FIG. 6, the block 14 is provided with an axial bore 33 in which a pin 32 is slidably mounted. This pin has a reduced end portion 34 of such size as to fit in holes 28, 30. The pin 32 is urged outwardly by spring 36, and is provided with a cable 38 which extends generally longitudinally through block 14 and terminates in a ring or other grip means 40. The cable 38 may be attached to pin 32 in any desired manner. One arrangement is shown in FIG. 7. Reduced end 42 of pin 32 is provided with a hole 44 through which cable 38 extends. The latter is provided with a washer 46 and a clip 48 of such size that they do not pass completely through hole 44.

Figure 2:
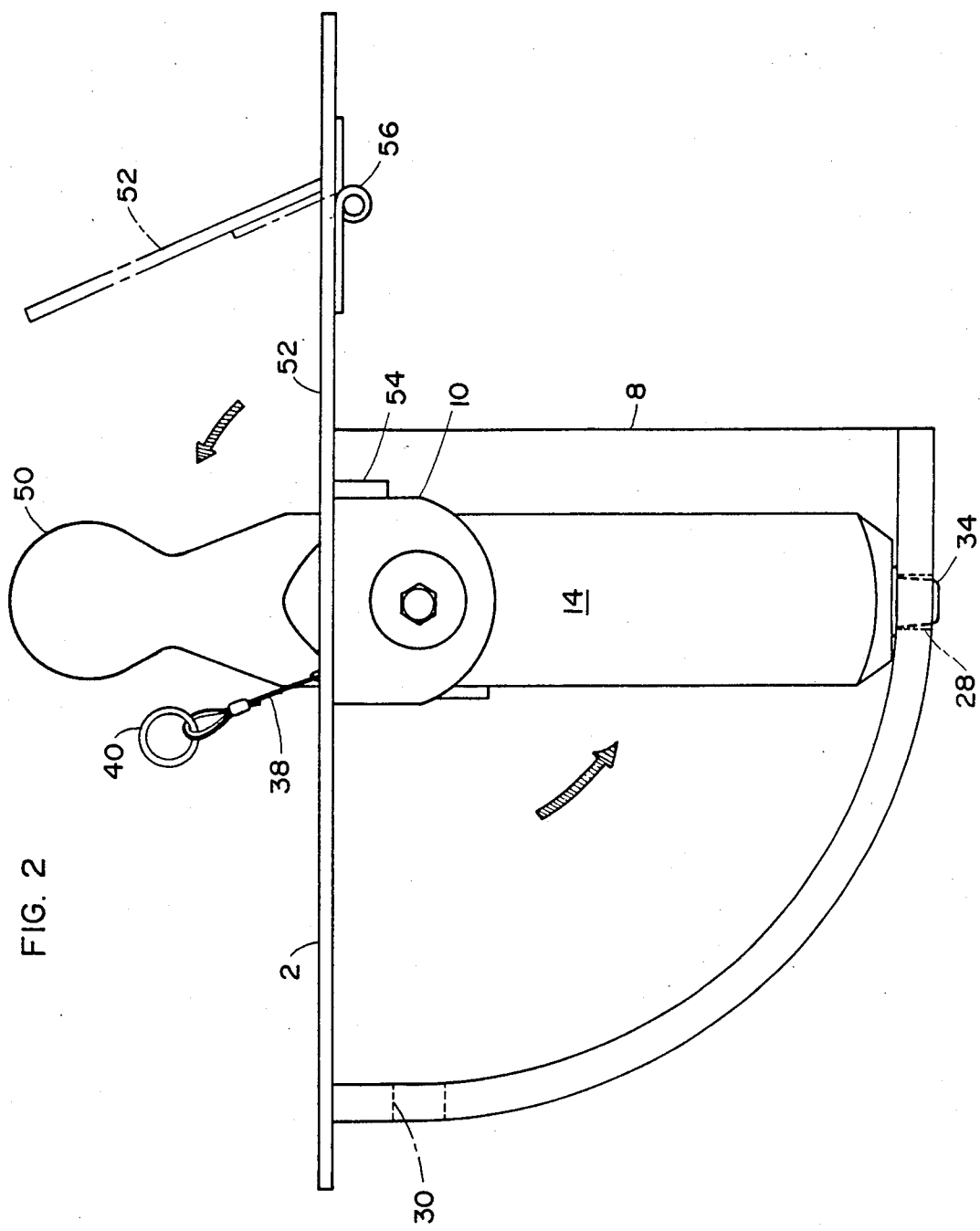
FIG. 2 is a side view of the hitch with the coupling block in a vertical position.

FIG. 2 shows the block 14 in the towing position. It should be noted that block 14 carries at its upper end a hitch ball which extends above top plate 2 and is connected to the tow bar of a trailer. Top plate 2 includes a cover 52 which in its closed position lies flush with top plate 2 and rests on a ledge 54 on block 14. In this position it closes aperture 6. Cover 52 is preferably provided with a spring 56 which urges it closed and a hole 58 for ease in opening. In this position the end portion 34 of pin 32 enters hole 28 and holds block 14 in position. Cover 52, which engages block 14 above the journaled axis, cooperates with pin 32 to hold the block firmly.

Figure 3:
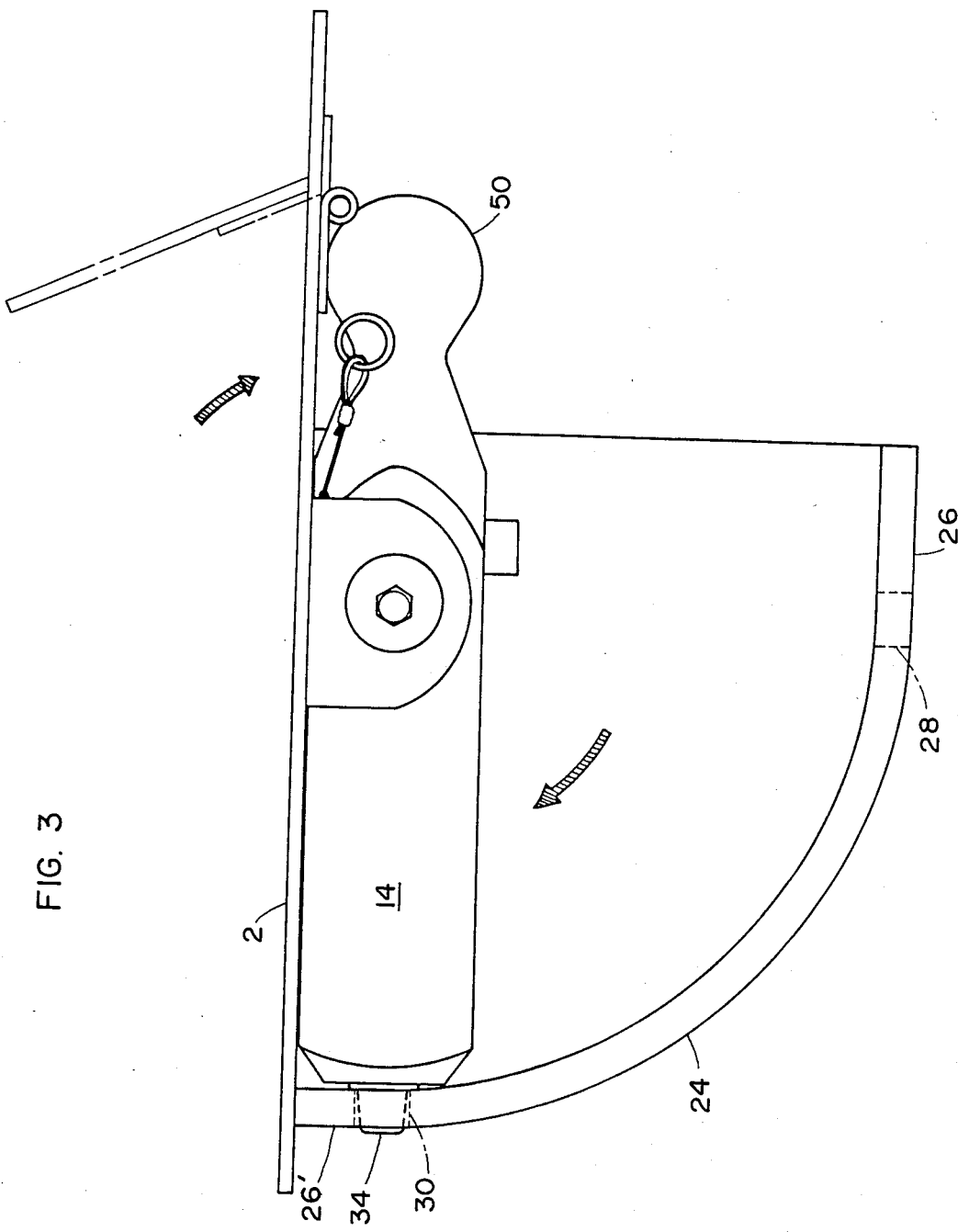
FIG. 3 is a side view showing the coupling block in a horizontal position.

When it is desired to use the vehicle for hauling material the operator grasps ring 40, and, by means of cable 38, retracts pin 32. He raises cover 52, then tips block 14 to the position shown in FIG. 3, in which position reduced end 34 of pin 32 enters hole 30. The entire block 14, including hitch ball 50, is now beneath plate 2 and so out of the way of material to be hauled. In moving block 14 between these two positions the cover 52 is raised to the position shown in phantom lines in FIGS. 2 and 3 and in solid lines in FIG. 1.

If frame members are so positioned that bolts through holes 1 may engage them, this would provide sufficient strength for pulling. Otherwise, members 8 and 24 are connected by welding rods between them and members of the frame.

While I have described my preferred structure in considerable detail, it will be understood that various changes can be made. I therefore wish my invention to be limited solely by the scope of the appended claims.

The embodiments of the invention in which a proprietary right or privilege is claimed are defined as follows:

1. A trailer hitch adapted for use in a vehicle having a bed for the transportation of material comprising:

a plate adapted to lie substantially flush with said bed, said plate having an aperture therein;

a hitch block extending through said aperture and having a connecting means at one end for connection to a trailer, said hitch block being journalled about an axis located sufficiently below said plate that when said hitch block is turned horizontally it lies completely below said plate, said hitch block having a longitudinal bore at the opposite end from said connecting means;

a pin slidably mounted in said bore, a spring in said bore urging said pin outwardly;

flexible means extending substantially longitudinally through said block and having one end connected to said pin;

grip means on the opposite end of said flexible means from said pin; and restraining means beneath said plate, said restraining means having one hole positioned vertically beneath said axis and a second hole positioned horizontally of said axis, said holes being spaced from said axis by such distances that they will receive the end of said pin when said block is in the proper position.

2. A device as defined in claim 1 wherein said restraining means comprises an arcuate member pierced by said holes.

3. A device as defined in claim 1 wherein said restraining means comprises a vertical plate positioned beside said aperture and containing a hole beneath said top plate in which said block is journaled and an arcuate plate member substantially integral with said vertical plate and substantially normal thereto, said arcuate member being pierced by said holes which receive said pin.

4. A device as defined in claim 3 and comprising a bracket extending downwardly from said top plate spaced from said vertical plate by at least the width of said block, said bracket containing a hole in axial alignment with the hole in said vertical plate, and a pin passing through said two last named holes on which said block is journaled.

5. A device as defined in claim 1 wherein said block is journaled at a point near one end of said aperture, said aperture is sufficiently large to permit said block to pass through it when said block is turned to its horizontal position, and a cover hinged to said top plate, at the other end of said aperture, said cover being of such length as to rest against said block when block is in its towing position.

* * * * *